United States Patent [19]

Bricheno

[11] Patent Number: 4,474,431
[45] Date of Patent: Oct. 2, 1984

[54] OPTICAL FIBRE DIRECTIONAL COUPLER

[75] Inventor: Terry Bricheno, Great Sampford, England

[73] Assignee: International Standard Electric Corporation, New York, N.Y.

[21] Appl. No.: 558,259

[22] Filed: Dec. 5, 1983

Related U.S. Application Data

[63] Continuation of Ser. No. 322,604, Nov. 18, 1981, abandoned, which is a continuation of Ser. No. 098,006, Nov. 28, 1979, abandoned.

[30] Foreign Application Priority Data

Dec. 20, 1978 [GB] United Kingdom ............... 49255/78

[51] Int. Cl.³ ............................................. G02B 5/172
[52] U.S. Cl. .................... 350/96.15; 350/96.16
[58] Field of Search ............... 350/96.15, 96.16, 96.21; 356/73.1

[56] References Cited

U.S. PATENT DOCUMENTS

| 4,008,061 | 2/1977 | Ramsay | 350/96.15 X |
| 4,019,051 | 4/1977 | Miller | 350/96.15 X |
| 4,054,366 | 10/1977 | Barnoski et al. | 350/96.15 |
| 4,135,780 | 1/1979 | Dyott | 350/96.15 |
| 4,289,373 | 9/1981 | Sugimoto et al. | 350/96.15 |
| 4,289,398 | 9/1981 | Robichaud | 350/96.15 X |
| 4,290,668 | 9/1981 | Ellis et al. | 350/96.21 X |
| 4,300,811 | 11/1981 | Ettenberg et al. | 350/96.15 X |

FOREIGN PATENT DOCUMENTS

1252126 11/1971 United Kingdom .

OTHER PUBLICATIONS

*Applied Optics,* vol. 17, No. 13, Jul. 1, 1978, pp. 2077-2079, Ogawa et al., "Multimode Fiber Coupler".
*Applied Optics,* vol. 16, No. 7, Jul. 1977, pp. 1794-1795, Kawasaki et al., "Low Loss Access Coupler for Multimode Optical Fiber Distribution Networks".

*Primary Examiner*—William L. Sikes
*Assistant Examiner*—Frank González
*Attorney, Agent, or Firm*—John T. O'Halloran; Peter R. Ruzek; Mary C. Werner

[57] ABSTRACT

An optical fibre directional coupler has first and second optical fibres clamped together by a piece of low index heat-shrunk tubing 12. The first fibre consists solely of a core 10 and cladding 11 while the second has a core 13 a primary cladding 14 whose cross-sectional area is larger than that of the core, and a secondary cladding 15. The outermost layer of each fibre is absent over a portion of its length within the tubing 12 so that the core 10 of the first is in intimate contact with the primary cladding 14 of the second. The second fibre may have a mode stripper 45 to strip modes guided by the primary/secondary cladding interface. Fibre break detection apparatus and a single-fibre two-way transmission system are described which use such directional couplers.

8 Claims, 5 Drawing Figures

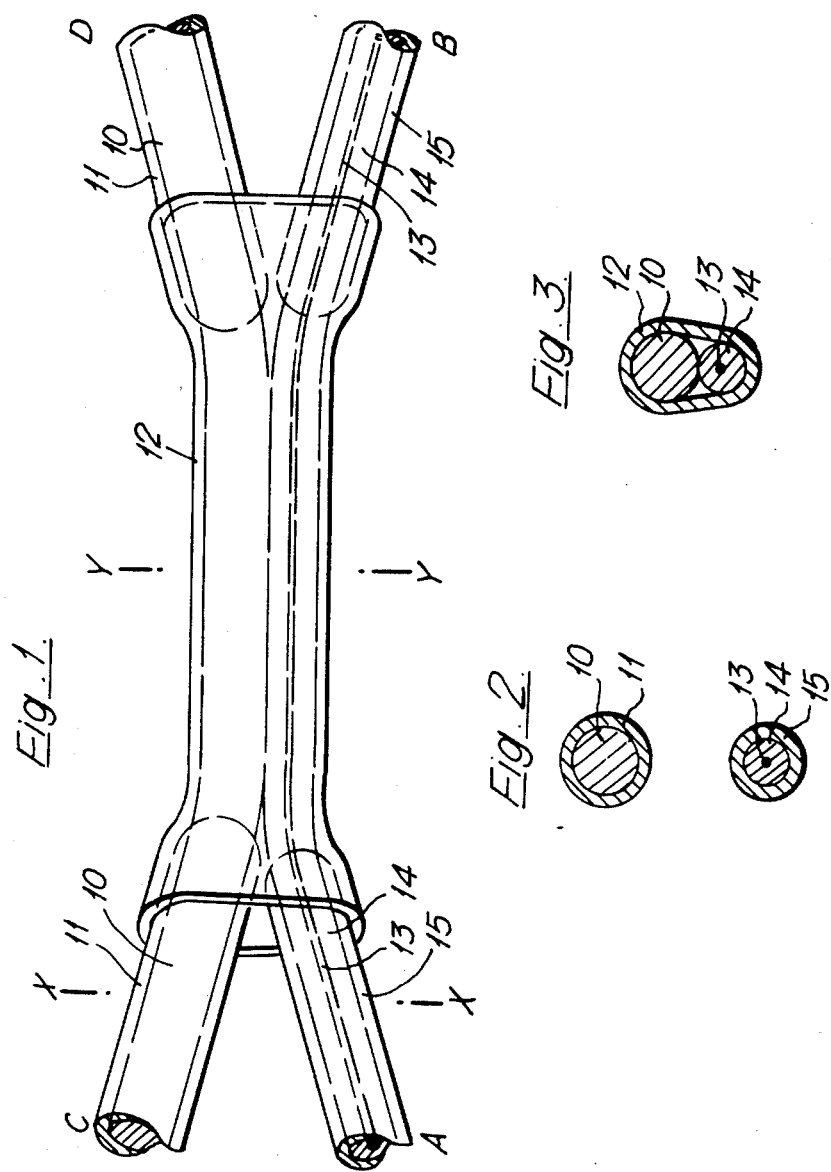

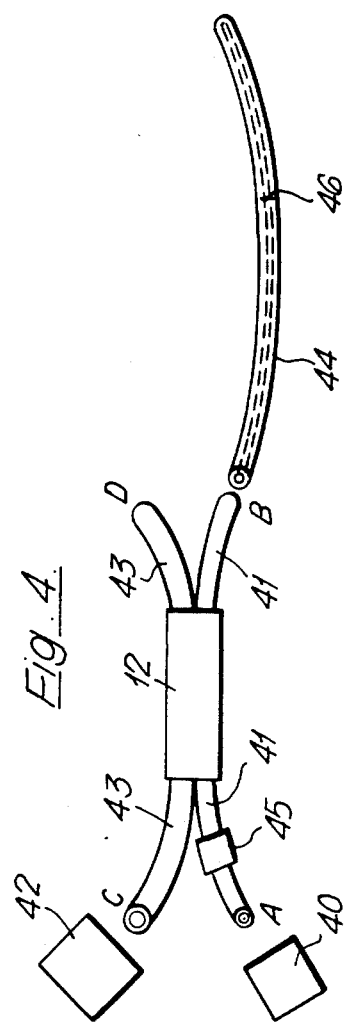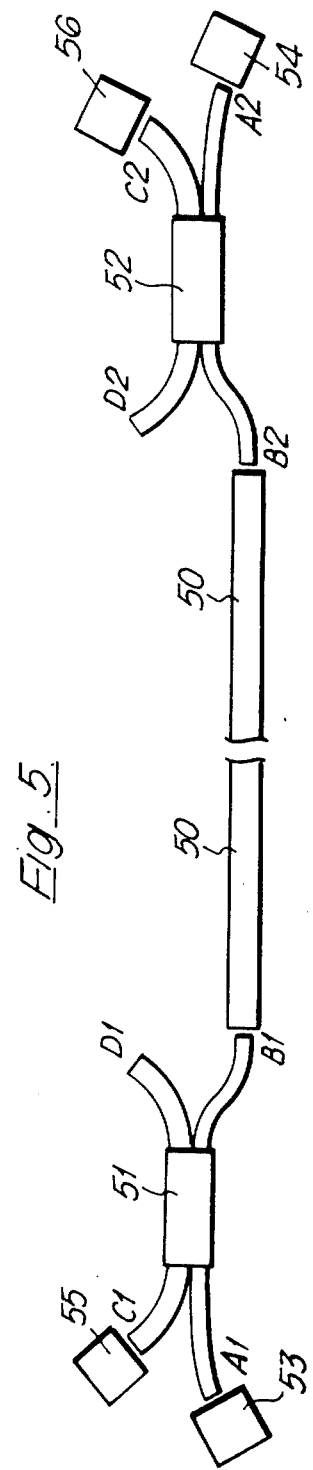

OPTICAL FIBRE DIRECTIONAL COUPLER

This application is a continuation, of application Ser. No. 322,604, filed Nov. 18, 1981, now abandoned, which is a continuation of application Ser. No. 098,006, filed Nov. 28, 1979, now abandoned.

This invention relates to optical fibre directional couplers.

According to the invention there is provided an optical fibre directional coupler in which first and second optical fibres thread a piece of heat-shrunk tubing which holds them in intimate contact, wherein the first optical fibre has an optical core region housing no internal waveguiding structure which core region is surrounded by a lower refractive index optical cladding region, and the second optical fibre has a core region surrounded by a lower refractive index primary optical cladding region which is itself surrounded by a still lower refractive index secondary optical cladding region, wherein the thickness of the primary optical cladding is such that the evanescent field associated with propagating modes associated with the waveguiding structure provided by the core and primary cladding is vanishingly small at the outer surface of the primary cladding, wherein the refractive index of the secondary cladding of the second fibre is less than that of the core of the first fibre, and the refractive index of the heat-shrunk tube is less than that of the core of the first fibre and also less than that of the primary cladding of the second fibre, wherein over an overlapping portion of their length within the heat-shrunk tubing the cladding and secondary cladding are absent respectively from the first and second optical fibres such that the thereby exposed core of the first fibre and primary cladding of the second fibre are held in intimate contact by the heat-shrunk tubing.

There follows a description of an optical fibre directional coupler embodying the invention in a preferred form, of an optical fibre break detection apparatus employing such a coupler, and of a single fibre two-way transmission system employing a pair of such couplers. The description refers to the accompany drawings, in which:

FIG. 1 depicts the directional coupler,

FIGS. 2 and 3 depict section through the directional coupler of FIG. 1 respectively on the lines XX and YY, FIG. 4 depicts fibre break detection apparatus employing a directional coupler of the type depicted in FIG. 1, and FIG. 5 depicts a single fibre two-way transmission system employing a pair of directional couplers of the type depicted in FIG. 1.

Referring to FIG. 1, a first optical fibre comprising a glass optical core 10 surrounded by a lower refractive index plastics optical cladding 11 is threaded through a length 12 of heat-shrinkable plastics tubing together with a second optical fibre comprising a glass optical core 13 surrounded by a lower refractive index glass primary optical cladding 14 which is itself encased in a plastics sheath forming a secondary optical cladding 15 which is of still lower refractive index. For a distance somewhat shorter than the length of the piece of heat shrinkable tubing, the plastics cladding and plastics sheathing are removed from their respective fibres. The tubing is then placed in position over the portions of exposed glass, which are typically about 5 cm long, and is heated to cause it to shrink and thereby hold the glass parts of the two fibres clamped together in intimate contact. The heat-shrinkable tubing is made of a material having a refractive index lower than that of both the core of the first fibre and the primary cladding of the second. For reasons which will become apparent later the core of the first fibre is required to have a higher refractive index than that of the sheathing of the second fibre, and is normally chosen to have a larger diameter than that of the primary cladding of the second fibre. The ends of the second fibre form ports A and B of the coupler while the ends of the first fibre form ports C and D.

In a typical coupler the first fibre has a 350 micron silica core, while the second has a 30 micron diameter doped silica core surrounded by a 100 micron external diameter silica cladding. The glass part of this second fibre is conveniently made at least in part by a vapour deposition process.

The plastics cladding and plastics sheathing are both made of a low index silicone resin of a type commonly used for plastics clad silica optical fibre. The heat-shrinkable tubing may be made of polyvinylidene fluoride or of polytetrafluorethylene.

In the second fibre the interface between the core 13 and cladding 14 provides optical waveguiding action, and is capable of supporting a set of modes hereinafter designated core modes. Similarly the interface between the cladding 14 and the sheathing 15 provides optical waveguiding action, and is capable of supporting a set of modes hereinafter designated cladding modes. In the case of core modes, the evanescent field at the outer surface of the cladding is vanishingly small, and hence the propagation of these modes is unaffected by the dielectric properties of material immediately surrounding the cladding. Thus core modes will propagate from one end of the second fibre to the other without being coupled into the first fibre. In the case of cladding modes however, the evanescent field is not negligible in the region immediately surrounding the primary cladding, and hence propagation of these modes is affected by the dielectric properties of material in that region. The number of propagating cladding modes supported by the interface between the primary and secondary claddings of the second fibre is determined by their refractive indices. The core 10 of the first fibre has a larger refractive index than that of the secondary cladding of the second, and so, in the region of contact between the core of the first and the primary cladding of the second fibre, power from at least some of the propagating cladding modes of the second fibre will tend to be coupled into propagating modes in the first fibre. Since the length of the region of contact, the coupling length, is very much greater than either fibre diameter an equilibrium condition is reached. Thus in the case of a directional coupler having the particular dimensions and construction quoted above in which the diameter of the silica core of the first fibre is 350 microns and the external diameter of the silica cladding of the second is 100 microns, the ratio of the power coupled into the first fibre from the cladding modes to that remaining in the second fibre is approximately twelve to one, that is to say the ratio is in direct proportion to the relative areas of the core of the first fibre and the core and primary cladding of the second fibre.

One particular application for such a directional coupler is in the detection of breaks in a length of fibre to be tested. For this purpose light is launched from a source 40 (FIG. 4) into port A of the second fibre 41 of the directional coupler, while a detector 42 is placed to receive light emitted from port C of the first fibre 43. One end of the length of fibre under test 44 is coupled to port B.

Light from the source 40 is launched into the core of the second fibre. If there is any risk that cladding modes will be launched as well as core modes, a mode stripper 45 is interposed on the second fibre between port A and the coupling region within confines of the heat-shrunk tubing to strip the cladding modes before they can reach the coupling region. The core modes are not coupled into the first fibre and so propagate to port B, suffering only the minimal loss due to the normal optical attenuation of the length of fibre extending between ports A and B. This light is then launched into the fibre under test. If there is a break 46 in the test fibre, this break will reflect part of the incident light back into port B of the directional coupler. Provided that at least a significant proportion of this reflected light is launched into port B in cladding modes rather than core modes, then the majority of this significant proportion will be coupled into the first fibre, and be directed at the detector from port C. If the test fibre has a significantly larger core diameter than that of the core of the second fibre of the directional coupler, then clearly a significant proportion of the reflected signal will be launched as cladding modes. In other instances the end of the test fibre will have to be spaced from port B a sufficient distance for the reflected beam to have diverged to a size significantly larger than the core diameter of the second fibre by the time it reaches port B.

If the break detector locates breaks by measuring time lapse in a manner analogous with pulsed radar, then Fresnel reflection of the launched light by port B, by the input end face of the test fibre, and by the other end face of the fibre may be tolerable because they are adequately resolvable. Similarly the mode stripper can be dispensed with. Provided that port B is properly made with a flat end face perpendicular to the fibre axis, reflection at this face will cause no problem because the propagating core modes will be reflected back to port A as core modes. Similarly the test fibre is butted close against the second fibre, any reflection at the input end of the test fibre should not give rise to any cladding modes. A reflection at the further end of the test fibre will of course give rise to cladding modes, but reflections at this end of the test fibre, and at the other, can both be suppressed by appropriate index matching.

It may be noted that if reflection at the input end of the test fibre is suppressed it is possible to dispense with the mode stripper even when break detector does not have the facility to locate but this will also necessitate suppressing reflections at port D. In this case most of the light launched from the source into cladding modes in the second fibre will be coupled into the first fibre to emerge via port D. The remainder will be launched without reflection into the test fibre where some of it may propagate in core modes of the test fibre to be reflected by any break, and thus contribute to the wanted signal. Reflection at port D can not be tolerated because most of the reflected signal would remain in the first fibre and thus provide the detector with a spurious signal.

The mode stripper 45 is conveniently made by removing a portion of the secondary cladding and replacing it with an absorbing dielectric material such as a polymer loaded with carbon black. This will strip cladding modes, but will not affect core modes since their evanescent field effectively does not penetrate as far as the absorbing material.

The performance of the directional coupler in producing a signal from port C depends upon the core diameter of the test fibre. Thus, neglecting the fibre attenuation losses in the coupler and also connector coupling losses, if power P is launched into core modes at port A, then all this power would be launched into a test fibre having a 150 microns core diameter that is coupled directly to port B. If this test fibre attenuates the light by a transmission factor T by the time it reaches the first break, and if this break has a reflection coefficient R, then the power of the reflected light emerging from the test fibre will be $PT^2R$. Assuming that the power is evenly distributed over the whole end face of the test fibre core, only 45% of the emerging light will be launched back into core and cladding modes while the rest will be lost on account of the larger cross-sectional area of the test fibre core. Assuming that the ratio of power launched into cladding modes and into core modes is in direct proportion to their cross-sectional area, then 91% of the light that is launched back into the coupler in core or cladding modes is launched back in cladding modes. 92% of this light is then coupled from the second fibre of the coupler into the first to emerge from port C. Thus in this instance the signal strength is $0.38 PT^2R$. Now if the test fibre were replaced with one having a core diameter of only 50 microns the same amount of power would be launched into it as in the first example. Similarly, provided that the reflection and attenuation coefficient were the same as in the first example, the power of the reflected light emerging from the test fibre will also be unchanged. In this instance however all the emergent light will be collected as core modes or cladding modes. Making the same assumptions as before, a greater proportion, 36%, of the light is launched into core modes; but because no light is lost, a greater proportion, 64%, of the light is also launched into cladding modes. Thus in this instance the signal strength at the detector is $0.59 PT^2R$.

Now if the directional coupler were replaced with a conventional 3 dB coupler made from a pair of identical fibres, the strongest signal is provided when the core diameter of these fibres is matched with that of the test fibre. In this instance the power launched into the test fibre is $0.5 P$, the reflected power launched back into the coupler is $0.5 PT^2R$, and the signal reaching the detector is $0.25 PT^2R$. If the same conventional 3 dB coupler is then used with the second test fibre having a 50 microns core diameter only 10% of the power from port B is launched into core modes in the test fibre, and hence the signal reaching the detector is only $0.025 PT^2R$. This demonstrates that the conventional 3 dB coupler is less efficient in both instances, and that it is less versatile in that the efficiency drops off rapidly if used with a test fibre having a different sized core diameter.

Referring to FIG. 5, another application for the directional coupler of FIG. 1 is in the provision of two-way communication system using a single optical fibre link. In this system a single optical fibre 50 directly connects ports $B_1$ and $B_2$ of two identical directional couplers 51 and 52. Ports $A_1$ and $A_2$ of the directional couplers are connected to modulated light sources 53 and 54, while ports $C_1$ and $C_2$ are connected to detectors 55 and 56. The core diameter of the fibre link is matched with the external diameter of the primary cladding of the second fibres of the two directional couplers in order to optimise the transfer of power from each source to its conjugate detector at the other end of the fibre link 50.

Now, making the same assumptions used in the previous analysis concerning the distribution of light and neglecting fibre attenuation losses in the directional couplers together with the connector coupling losses, if power P is launched in core modes into part $A_1$ from source 53, and if the fibre link attenuates the light by a transmission factor T, then the signal power received by detector 56 is 0.91×0.92 PT. (The relative sizes of core and primary cladding result in 9% of the power emerging from the fibre being launched as core modes instead of cladding modes, and only 92% of the power in the cladding modes is transferred to the first fibre of directional coupler 52.) This received signal strength of 0.84 PT is about 5 dB better than the best value obtainable using optimally matched conventional 3 dB directional couplers which is 0.25 PT.

A further advantage of using FIG. 1 type directional couplers rather than conventional 3 dB directional couplers concerns the reduced magnitude of unwanted signals generated by reflection at the couplings between the fibre link and the two directional couplers. If these couplings have a reflection coefficient R but are otherwise lossless then, neglecting light reflected more than once, the wanted signal received by detector 56 is $0.91 \times 0.92$ PT $(1-R)^2$. The ratio of unwanted signal to wanted signal is thus always less than unity. In the case of a system using matched conventional 3 dB couplers, the wanted signal received by detector 56 (neglecting multiple reflections) is 0.25 PT $(1-R)^2$, while the unwanted signal received by detector 55 is 0.25 PT $1+T^2(1-R)$. In this instance the ratio of unwanted signal to wanted signal is larger than unit if the reflectivity R is comparable in magnitude with the fibre transmission T. Only if the fibre transmission is greater than the reflectivity of the couplings can this ratio be reduced below unity.

I claim:

1. An optical fibre directional coupler comprising:
   a first optical fibre having oppositely located first and second ports, an optical core of a predetermined refractive index and an optical cladding surrounding said core and having a lower refractive index than said core;
   a second optical fibre having oppositely located third and fourth ports, a core of a predetermined refractive index, a primary optical cladding surrounding said core and having an index of refraction lower than said core and a cross-sectional area larger than the cross-sectional area of the core, and a secondary optical cladding surrounding said primary cladding and having a refractive index lower than said primary cladding, said secondary cladding having a refractive index less than said core of said first optical fibre, said first and second optical fibres being positioned adjacent each other to form a coupling region wherein the optical cladding of the first fibre and the secondary cladding of the second fibre have been removed, said first and third ports being positioned on the same side of the coupling region positioned in use that said third port receives light and transmits the core modes thereof through said core of said second fibre to said fourth port and into an additional fibre positioned adjacent thereto, said fourth port receives a greater proportion of cladding modes than core modes from the additional fibre, and the cladding modes from the fourth port are conveyed through the coupling region predominantly to said first port for detection thereat; and
   means for holding said first and second optical fibres in intimate contact in said coupling region.

2. The optical fibre directional coupler as claimed in claim 1 wherein the diameter of the core of the first fibre is larger than that of the primary cladding of the second fibre.

3. The optical fibre directional coupler as claimed in claim 1 wherein the cladding of the first fibre and the secondary cladding of the second fibre are both made of plastic and the core of the first fibre and the core and primary cladding of the second fibre are made of glass.

4. The optical fibre directional coupler as claimed in claim 3 wherein said glass is selected from the group consisting of pure silica and doped silica.

5. The optical fibre directional coupler as claimed in claim 1 further comprising a cladding modes modestripper positioned on said second optical fibre before the coupling region.

6. The optical fibre directional coupler as claimed in claim 5 wherein said mode stripper is provided by a region of optically absorbing dielectric material replacing a portion of the secondary cladding of the second fibre.

7. A single optical fibre two-way transmission system comprising:
   first and second directional couplers;
   first and second light sources;
   first and second photodetectors; and
   a single optical fibre transmission link,
   said first and second directional couplers each including
   a first optical fibre having oppositely located first and second ports, an optical core of a predetermined refractive index and an optical cladding surrounding said core and having a lower refractive index than said core,
   a second optical fibre having oppositely located third and fourth ports, a core of a predetermined refractive index, a primary optical cladding surrounding said core and having an index of refraction lower than said core and a cross-sectional area larger than the cross-sectional area of the core, and a secondary optical cladding surrounding said primary cladding and having a refractive index lower than said primary cladding, said secondary cladding having a refractive index less than said core of said first optical fibre, said first and second optical fibres being positioned adjacent each other to form a coupling region wherein the optical cladding of the first fibre and the secondary cladding of the second fibre have been removed,
   means for holding said first and second optical fibres in intimate contact in said coupling region,
   said first light source being coupled to said third port of said second optical fibre of said first coupler,
   said first photodetector being coupled to said first port of said first optical fibre of said first coupler,
   said second light source being coupled to said fourth port of said second fibre of said second coupler,
   said second photodetector being coupled to said third port of said first fibre of said second coupler, said single optical fibre transmission link connected to said fourth port and said third port respectively of said first and second directional couplers, and said first and third ports of each coupler being positioned on the same side of the respective coupling regions, said ports being so positioned in use that said third port and said fourth port respectively of said first and second couplers receive light and transmit the core modes thereof through said cores of said second fibres to said fourth and third ports respectively of said first and second couplers and into said single optical fibre transmission link, said fourth and third ports respectively of said first and second couplers receive a greater proportion of cladding modes than core modes from said link, and the cladding modes from said fourth and third ports respectively of said first and second couplers are conveyed predominantly to said first and second ports respectively of said first and second couplers through the coupling regions for detection thereat.

8. A single optical fibre two-way transmission system as claimed in claim 7 wherein the core diameter of the single optical fibre transmission link matches the diameter of the primary cladding of the second fibres of both directional couplers.

* * * * *